(12) United States Patent
Hellesoe Dall et al.

(10) Patent No.: US 9,676,558 B2
(45) Date of Patent: Jun. 13, 2017

(54) METHOD OF PRODUCTION OF CONVEYING WIRE AND CONVEYING WIRE

(71) Applicant: DALTEC A/S, Egtved (DK)

(72) Inventors: Michael Hellesoe Dall, Aarhus (DK); Christian Hellesoe Dall, Jerlev (DK)

(73) Assignee: Daltec A/S, Egtved (DK)

( * ) Notice: Subject to any disclaimer, the term of this patent is extended or adjusted under 35 U.S.C. 154(b) by 36 days.

(21) Appl. No.: 14/442,163

(22) PCT Filed: Nov. 12, 2013

(86) PCT No.: PCT/DK2013/050371
§ 371 (c)(1),
(2) Date: May 12, 2015

(87) PCT Pub. No.: WO2014/071957
PCT Pub. Date: May 15, 2014

(65) Prior Publication Data
US 2016/0289004 A1    Oct. 6, 2016

(30) Foreign Application Priority Data
Nov. 12, 2012  (DK) ................................ 2012 70693

(51) Int. Cl.
*B29C 45/14*  (2006.01)
*B65G 19/24*  (2006.01)
(Continued)

(52) U.S. Cl.
CPC .............. *B65G 19/24* (2013.01); *B65G 19/14* (2013.01); *B65G 19/20* (2013.01); *B29C 45/14* (2013.01)

(58) Field of Classification Search
CPC .............. B29C 45/14; B29C 45/14016; B29C 455/14057; B29C 414/262;
(Continued)

(56) References Cited

U.S. PATENT DOCUMENTS 2,680,511 A    6/1954  Hapman
5,062,741 A *  11/1991  Pirovano ................ B65G 19/14
                                                    198/716
(Continued)

FOREIGN PATENT DOCUMENTS

EP    0156419 A2    2/1985
EP    0659661 A1    11/1994
(Continued)

OTHER PUBLICATIONS

International Search Report for International Application No. PCT/DK2013/050371 dated Feb. 4, 2014.
(Continued)

*Primary Examiner* — Leslie A Nicholson, III
*Assistant Examiner* — Lester Rushin
(74) *Attorney, Agent, or Firm* — Dykema Gossett PLLC

(57) ABSTRACT

A method of production of a conveying wire that includes a fiber wire with disc-shaped conveying members, the fiber wire including twisted strands each made from synthetic plastic threads or fibers, includes coating at least one section of the fiber wire with an outer jacket by a continuous injection molding process and connecting disc-shaped conveying members by injection molding directly onto the at least one section of the outer jacket or directly onto the fiber wire, and connecting opposed end parts of each section of the outer jacket to opposed end parts of disc-shaped conveying members, while maintaining the fiber wire under tension during unwinding and during winding.

13 Claims, 3 Drawing Sheets

(51) Int. Cl.
*B65G 19/14* (2006.01)
*B65G 19/20* (2006.01)

(58) Field of Classification Search
CPC ........ B29C 45/14336; B29C 45/14409; B29C 45/14426; B29C 45/14549; B29C 45/14565; A61N 1/04; A61N 1/18
USPC ............... 198/717–732; 174/111; 406/76, 81
See application file for complete search history.

(56) References Cited

U.S. PATENT DOCUMENTS

| | | | |
|---|---|---|---|
| 7,411,130 B2 * | 8/2008 | Dall | B65G 19/24 174/111 |
| 2002/0033270 A1 * | 3/2002 | Fujii | A01K 5/0208 174/111 |
| 2006/0163038 A1 | 7/2006 | Dall | |

FOREIGN PATENT DOCUMENTS

| EP | 0767116 A2 | 6/1996 |
|---|---|---|
| GB | 747515 A | 4/1956 |

OTHER PUBLICATIONS

Danish Search Report for Danish Application No. PA 2012 70696 dated Jun. 28, 2013.

* cited by examiner

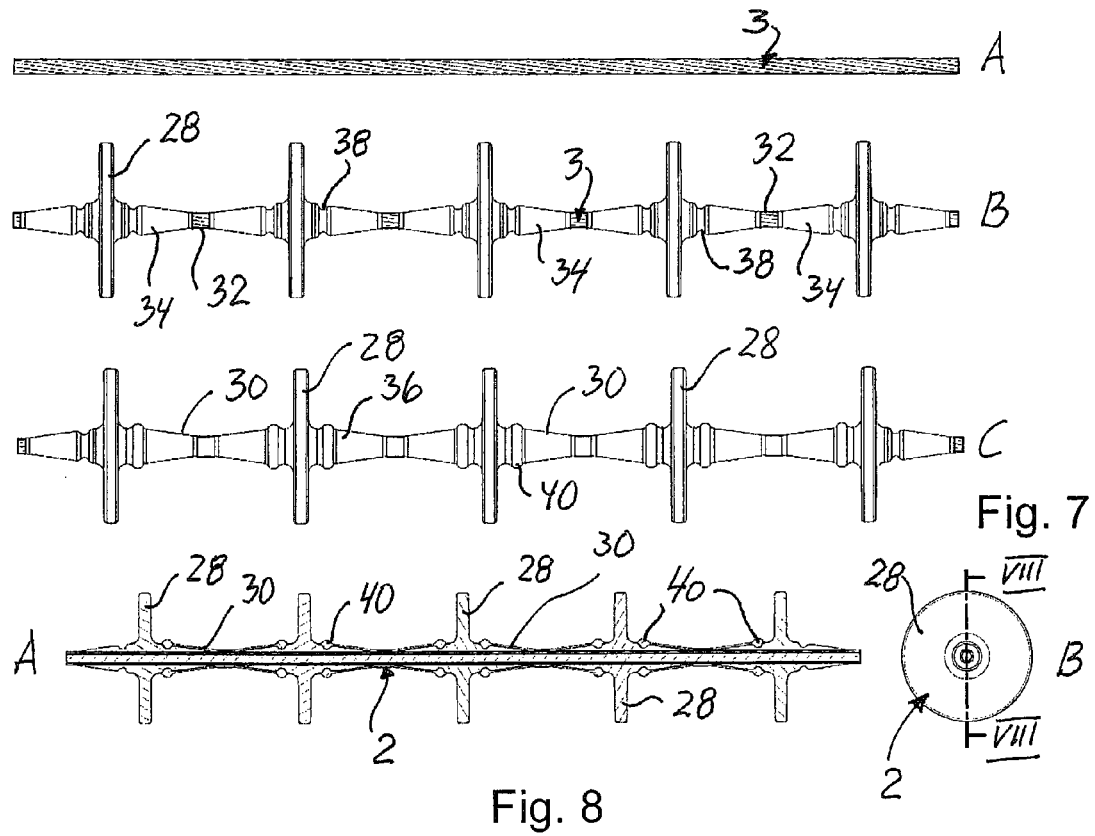
Fig. 7
Fig. 8
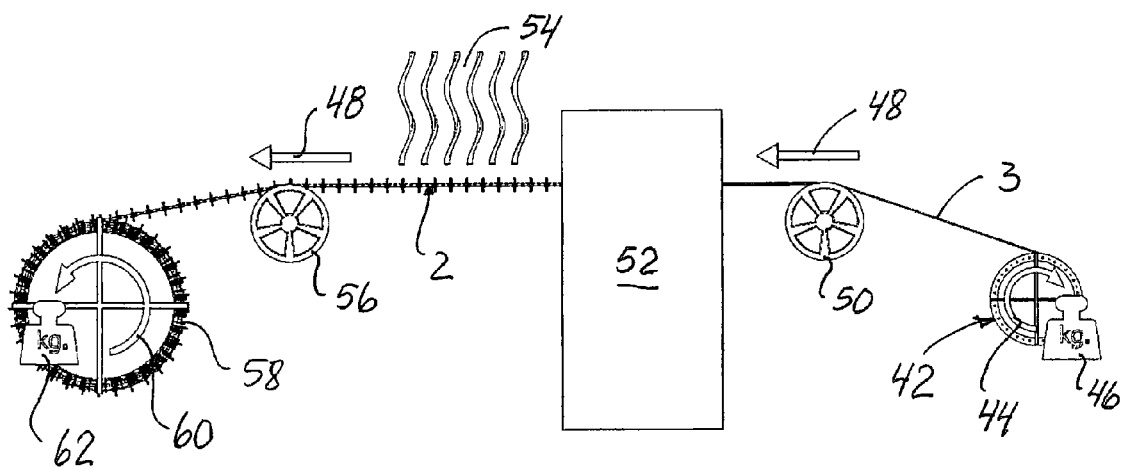
Fig. 9

METHOD OF PRODUCTION OF CONVEYING WIRE AND CONVEYING WIRE

CROSS REFERENCE TO RELATED APPLICATIONS

Reference is made to PCT Patent Application No. PCT/DK2013/050371, filed on Nov. 12, 2013, and Danish Patent Application No. 2012 70693, filed on Nov. 12, 2012, which applications are incorporated herein by reference in their entirety.

BACKGROUND OF THE INVENTION

Field of the Invention

The present invention concerns a method of production of conveying wire made from a fiber wire with a plurality of disc-shaped conveying members. The conveying wire includes either twisted strands or plaited strands, which strands are made from thin threads or fibers of synthetic plastic. The method comprises:

coating at least one section of the conveying wire with an outer jacket by a continuous injection moulding process; and connecting disc-shaped conveying members by injection moulding directly onto the at least one section of the outer jacket or directly onto the conveying wire.

The invention also concerns a conveying wire for use in an endless tube conveyor system comprising a number of disc-shaped conveying members.

Description of the Prior Art

EP-A1-0 659 661 describes a conveying cable made of polyester fibers, and which is used for transporting material in tube conveying systems, where disc-shaped conveying members of polyurethane manufactured by injection moulding are fastened directly on an outer sheath of polyurethane, which provides a permanent connection between the various components.

DK/EP 0767116 T3 discloses a conveying wire of a tube scraping conveyor, preferably for feeding installations in stables, including a steel wire and carriers. Carriers are provided on the conveying wire with relatively narrow spacing, forming an injection-moulding bond to the steel wire and with a moulded wire sheathing. The conveying wire is peculiar in that the carriers are a relatively stiff plastic mould with lateral, short thin cover extensions over the steel wire, while the sheathing is a separate elastic plastic moulding between neighboring carriers over the steel wire as well as over at least an outer part of the cover extensions, such that the wire sheathing is tightly bonded to the cover extensions.

US Published Application No. 2002/0033270 A1 discloses a disc cable for preventing occurrence of fine pieces of a metal wire material caused by wear and damage of a metal wire being mixed into feed. A cover layer formed of synthetic resin is formed on the surface of the metal wire, and a groove-like part to which the surface of the metal wire is exposed is formed which is not part of the cover layer in a predetermined spaced relation in a longitudinal direction of a cable. Then a disc formed of synthetic resin is moulded, and the synthetic resin flows into the groove-like part to form a protrusion on the disc to fixedly mount it on the cable to produce a disc cable having the discs disposed in a predetermined spacing relation on the cable.

SUMMARY OF THE INVENTION

The invention provides an improved method of production of a conveying wire of the above kind, and which in a simple manner enables achieving an extraordinarily good, permanent attachment of the outer jacket on the conveying wire and a direct connection between the outer jacket and the conveying wire, and at the same time an extraordinarily good adhesion between the conveying wire and the disc-shaped conveying members.

The method of production of a conveying wire according to the invention comprises:

connecting opposed end parts of the sections of an outer jacket to opposed end parts of the disc-shaped conveying members; and keeping the fiber wire tight during unwinding and keeping the conveying wire tight during winding.

In a simple manner it is hereby possible to achieve a completely extraordinary, good, permanent attachment of the outer jacket directly on the conveying wire, and a direct permanent connection between the outer jacket and the conveying wire and the disc-shaped conveying members.

Counteracting of opening the strands is achieved during the injection moulding of the disc-shaped conveying members directly onto the fiber wire or directly onto the outer jacket by holding tight both the fiber wire both before and after the injection moulding station.

The primary object of coating the fiber wire is to protect it against ingression of, for example, hard particulate minerals that otherwise would damage the fiber wire and eventually cause breakage. However, it is also important to protect the fiber wire which becomes more open on the surface over time due to loose fibers. This may enable dust, together with moisture, to bind on the surface, which after some time may be the cause of mould formation. In other words, it is an important secondary object of the outer jacket to ensure a substantially improved hygiene.

In order to ensure a more optimum mutual connection between the outer jacket and the disc-shaped conveying member, it may be advantageously to modify the method by including a further act of continuing the opposing end parts of the sections of the outer jacket under or over the opposed end parts of the disc-shaped conveying members.

Alternatively, in order to achieve an improved mutual connection between the outer jacket and the disc-shaped conveying members, it may be advantageous to modify the method of production of conveying wire according to the invention in comprising the further act of connecting annular beads or thickenings of opposed end parts of the sections with annular recesses of the opposed end parts of the disc-shaped conveying members.

According to another alternative, the method of production of a conveying wire according to the invention may modify the method according to the invention in comprising the further act of fastening the sections of the outer jacket a soft thermoplastic elastomer, for example Santoprene™, by direct injection moulding to the conveying wire with mutual spacing.

The method of production of a conveying wire according to the invention may be further modified comprising the further acts of:

disposing the annular beads or thickening of opposing end parts of the sections internal relative to the opposing end parts of the disc-shaped conveying members, and subsequently fastening the disc-shaped conveying members directly to the conveying wire.

Advantageously the method of production of a conveying wire according to the invention may comprise the further act of: using a basic wire, a fiber wire having twisted strands or plaited fibers.

The method of production of a conveying wire according to the invention may furthermore comprise the further acts of: injection moulding outer jacket parts directly onto the conveying wire with mutual spacing, and injection moulding disc-shaped conveying members directly onto the conveying wire between opposed end parts of the outer jacket parts.

According to a further alternative, the method of production of a conveying wire according to the invention, wherein use is made of the fiber wire with twisted strands or plaited fiber wire provided by injection moulding with mutually spaced, disc-shaped conveying members and with outer jacket parts therebetween, comprising the further acts in sequence of:

keeping the fiber wire tight during unwinding and keeping the conveying wire tight during winding;

injection moulding the outer jacket parts directly onto the fiber wire with mutual spacing, and injection moulding the disc-shaped conveying members directly onto the fiber wire between opposed end parts of the outer jacket parts.

According to a still further method of production of a conveying wire according to the invention, the method comprises the further act of:

injection moulding an outermost end part of the end parts of the conveying members in the soft thermoplastic elastomer, for example Santoprene™, together with the outer jacket before injection moulding of the conveying members there between.

In other words, the method according to the invention can be varied with regard to the sequence of injection moulding of the disc-shaped conveying members and the outer jacket parts, respectively, directly on the fiber wire, which in both cases, as an essential feature, is kept suitably tight during the injection moulding such that the strands of the fiber wire do not open during the injection moulding.

The invention also relates to a conveying wire for use in an endless tube conveyor system comprising disc-shaped conveying members, wherein the conveying wire either twisted strands or plaited strands that each is made from thin threads or fibers of synthetic plastic, with the conveying wire including an outer jacket over at least one section between the conveying members which are fastened directly to the conveying wire by injection moulding, opposing end parts of sections of the outer jacket extend under or over opposing end parts of the disc-shaped conveying members and that the conveying wire according to the invention has opposing end parts of sections of the outer jacket having an annular bead or thickening.

The fact that the outer jacket is fastened by injection moulding directly to the conveying wire at a very high pressure provides a more optimal attachment between the outer jacket and the conveying wire. This internal fastening of the outer jacket may furthermore be additionally advantageous in order to ensuring an optimal connection between the outer jacket and the disc-shaped conveying members, In addition, at the same time there is achieved possibility of choosing specific and more flexible plastic materials which can "cooperate".

Appropriately, the conveying wire according to the invention may be so modified that the sections of the outer jacket, which are fastened to the conveying wire with mutual spacing by injection moulding, have a soft thermoplastic elastomer, for example Santoprene™.

With the object of further optimizing connection between the outer jacket and the conveying wire, it may be advantageous to have the annular bead or thickening of opposing end parts of the sections disposed internally of the opposing end parts of the disc-shaped conveying members, which are subsequently fastened directly to the conveying wire.

An alternative embodiment of the conveying wire according to the invention is designed such that at the outermost end part of the end parts, the conveying members are the same soft material as the outer jacket in that the outermost end parts are injection moulded together with the outer jacket before injection moulding of the conveying members.

BRIEF DESCRIPTION OF THE DRAWINGS

The invention is explained in more detail in the following with reference to the drawing in which:

FIG. 7 shows three views A-C for illustrating a method for making an alternative conveying wire according to the invention in three method steps;

FIG. 8 shows two views A-B of a conveying wire according to the invention made by the method of FIG. 7; and FIG. 9 shows an embodiment for a plant for use in making a conveying wire according to the invention.

DETAILED DESCRIPTION OF EMBODIMENTS OF THE INVENTION

Figure 1:
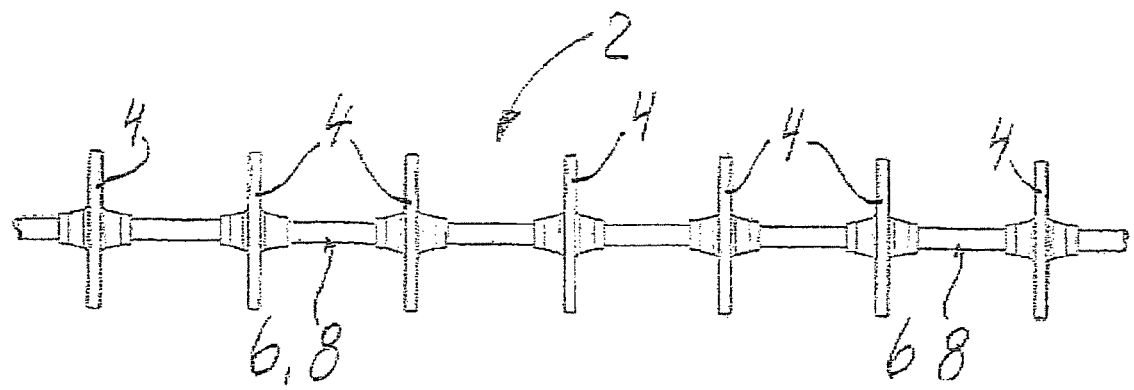
FIG. 1 shows a plan view of an alternative embodiment of a conveying wire according to the invention having disc-shaped conveying members.
Figure 2:
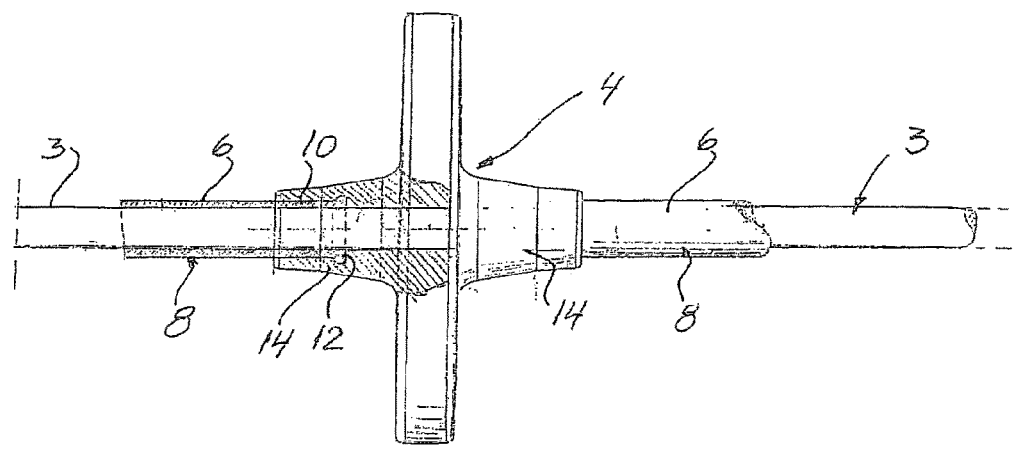
FIG. 2 shows plan view, partly in section, illustrating how the disc-shaped conveying members are fastened to the conveying wire in another embodiment.
Figure 3:
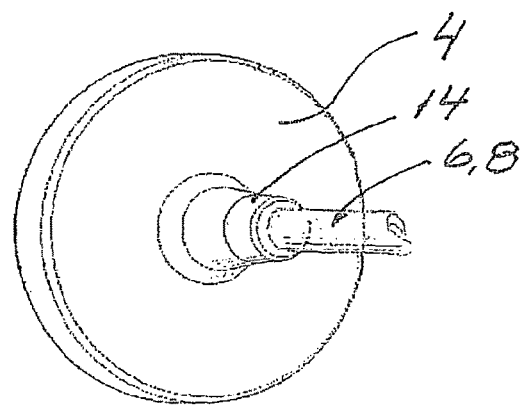
FIG. 3 shows a perspective view of an embodiment of a single disc-shaped conveying member according to the invention.

The conveying wire 2 shown in FIGS. 1-3 includes a twisted or plaited fiber wire 3 (basic wire) having either twisted strands or plaited strands that each are made of synthetic plastic thin threads or fibers. The conveying wire 2 also includes a number of disc-shaped conveying members 4 which are fastened by injection moulding directly to the fiber wire 3 and to an outer jacket 6 which is similarly fastened by injection moulding directly to the fiber wire 3.

The outer jacket 6 extends over sections 8 of the wire at least between the conveying members 4 as opposing end parts 10 of the sections 8 continue in under opposing end parts 14 of the conveying members 4.

As shown at the left side of FIG. 2, an end part 10 of the outer jacket 6 or section 8 is designed with an annular bead or thickening 12 which, during the subsequent injection moulding of conveying member 4, initially has the task of ensuring an optimal connection between the end parts 10 and 14.

By injection moulding the outer jacket 6 (coating) directly around the fiber wire 3, there is achieved—as opposed to traditional extrusion—a significantly better permanent adherence between the outer jacket 6 and the fiber wire 3, due to the high moulding pressure (400-500 bar).

Immediately before injection moulding of the conveying members 4 around the fiber wire 3, the outer jacket 6 is also moulded around the fiber wire 3. There is a large degree of freedom when deciding how the outer jacket 6, or more correctly, its sections 8, are to be designed. As described above, the sections 8 can be designed at opposing end parts 10 with a bead or thickening 12.

Alternatively, the end parts 10 can be without bead or thickening as the end parts 10 of course are intended to continue in under the end parts 14 of the conveying members 4.

According to a further embodiment, sections 8 on the fiber wire 3 can have a very narrow spacing as by the subsequent injection moulding of the conveying members 4 there will automatically be performed an adjusting of opposing end parts 10 of the sections 8 in that excessive parts are simply melted away or integrated with the end parts 14 of the conveying members 4.

Or the outer jacket 8 may, if possible, be injection moulded around the fiber wire 3 entirely without spacing because by the subsequent injection moulding of the conveying members 4 there may automatically occur a melting away of parts of the outer jacket 8 such that the conveying members 4 are fastened directly to the fiber wire 3.

The most important common feature of the described embodiments is that the outer jacket (coating) 8 is fastened directly to the fiber wire 3 by high pressure injection moulding.

Figure 4:
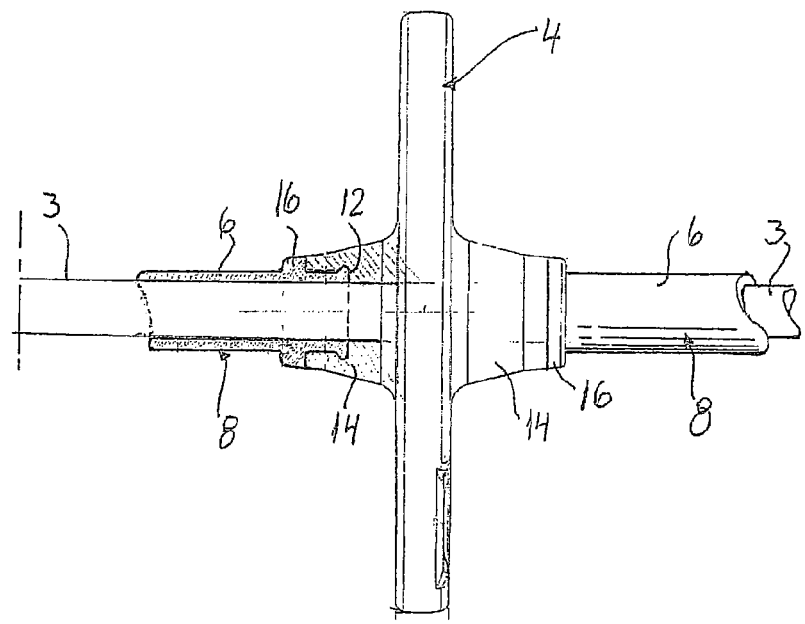
FIG. 4 shows a plan view, partly in section, of a further embodiment of a conveying wire according to the invention, where the outermost end parts of the disc-shaped conveying members are made of the same softer material as the outer jacket.

FIG. 4 shows an alternative embodiment where outermost end parts 16 of the conveying members 4 be made of the same soft material as the outer jacket 6. By the subsequent injection moulding of the conveying members 4, it may be assured to a lesser extent that the outermost end parts 16 are softened and melted together/integrated with the conveying members 4.

The softer outermost end parts 16 entail an obvious, though very important advantage, namely that the bending radius of the conveying wire 2 in this embodiment generally becomes less. Or, in other words, the conveying wire 2 as a unit becomes more flexible and therefore more easily can run about reversing or corner wheels with reduced diameters.

Figure 5:
FIG. 5 shows three views A-C for illustrating a method for making a conveying wire according to the invention in three method steps.
Figure 5:
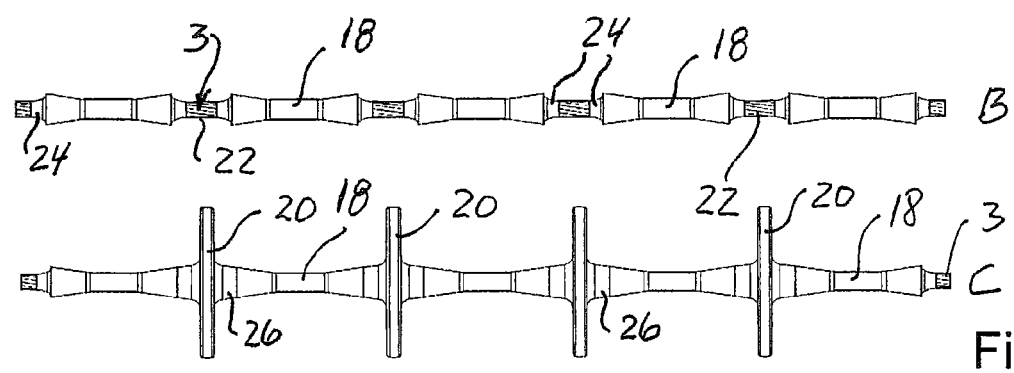

FIG. 5 shows three views A-C for illustrating a method for making a conveying wire 2 according to the invention, wherein separated outer jacket parts 18 with a specific shape, compare FIG. 5B, are fastened by injection moulding directly on a fiber wire 3 (FIG. 5A) at first. After that, disc-shaped conveying members 20, compare FIG. 5C, are fastened by injection moulding directly on the fiber wire 3 in interspaces 22 between the outer jacket parts 18. The last part of the injection moulding of the disc-shaped conveying members 20 occurs in such a way that opposing end parts 24 of the outer jacket members 18 extend in under foot parts 26 of the disc-shaped conveying members 20.

Figure 6:
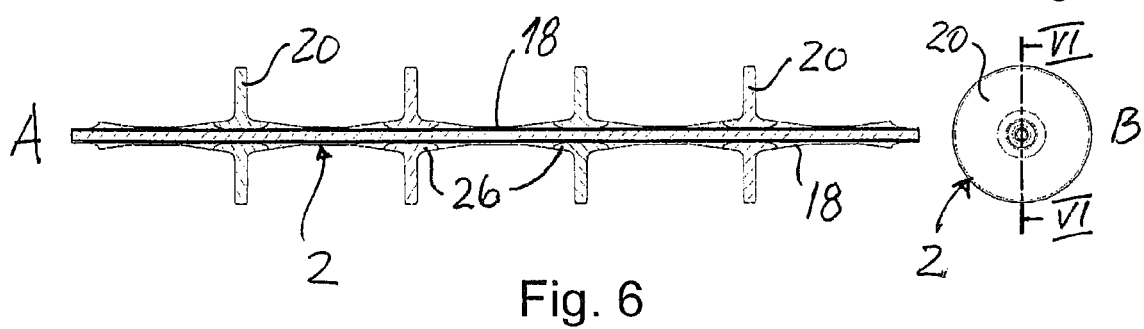
FIG. 6 shows two views A-B of a conveying wire according to the invention made by the method of FIG. 5.

FIG. 6A shows a view of a longitudinal section on the line VI-VI in FIG. 6B, showing an end view, partly in section, of a conveying wire 2 with disc-shaped conveying members 20 wherein it can be seen that the end parts 24 extend in under the foot parts 26 of the disc-shaped conveying members 20.

FIG. 7 shows three views A-C for illustrating a method for making a conveying wire 2 according to the invention, wherein mutually separated outer jacket parts 28 with a specific shape, compare FIG. 7B, are fastened by injection moulding directly on a fiber wire 3 (FIG. 7A). Then disc-shaped conveying members 30, compare FIG. 7C, are fastened by injection moulding directly on the fiber wire 3 in interspaces 22 between the disc-shaped conveying members 28 which at opposite sides comprise relatively long, outwardly tapering foot parts 34. The last part of the injection moulding of the outer jacket parts 30 occurs in such a way that opposing end parts 36 of the outer jacket members 30 extend in over the relatively long foot parts 34 of the disc-shaped conveying members 28.

FIG. 8A shows a view of a longitudinal section on the line VIII-VIII in FIG. 8B, showing an end view, partly in section, of a conveying wire 2 with disc-shaped conveying members 28 wherein it can be seen that the opposing end parts 36 of the outer jacket parts 30 extend in under the relatively long foot parts 34 of the disc-shaped conveying members 28.

FIG. 7B shows that the relatively long foot parts 34 of the disc-shaped conveying members 28 are designed with an annular concave recess 38 in which a ring-shaped bead 40, more clearly seen in FIG. 8A, of opposing end parts of outer jacket parts 30 engage. It will be understood that a conveying wire 2, compare FIG. 7C and FIG. 8A, respectively, has a flexibility that makes the conveying wire 2 well suited for running through relatively narrow turns (corner wheels with relatively small diameter).

FIG. 9 shows a drawing of an embodiment of a production plant for making a conveying wire 2 according to the invention, where a fiber wire 3 is unwound from a supply roll 42, which for the purpose of keeping the fiber wire 3 in tension is, for example, weight loaded clockwise (illustrated by curved arrow 44 and weight 46). The direction of production is illustrated by arrows 48.

The fiber wire 3 runs over a guide wheel 50 into an injection moulding machine 52 where disc-shaped conveying members and outer jacket parts, respectively, are fastened directly to the fiber wire 2 such that the conveying wire 2 to the left of the injection moulding machine 52 runs through a cooling zone 54, over a further guide wheel 56 to winding station 58, which for the purpose of keeping the conveying wire 2/fiber wire 3 in tension, is weight loaded counter clockwise (illustrated by curved arrow 60 and weight 62); alternatively a spring or other resisting means can be applied.

It will be understood that the sequence of fastening disc-shaped conveying members and outer jacket parts directly on the fiber wire 3 by injection moulding, compare the above, can be varied according to wish.

Finally, it is to be noted that the fiber wire 3 may consist of aramide (aromatic polyamide), Technora (aromatic polyamide/copolymer), aromatic liquid polyester fiber (Vectran fiber) or ultra high molecule weight polyethylene (Dynema- and Spectra fiber).

A common feature of these fibers is a relatively high elastic modulus (75 GPa-135 GPa), and in addition, the fibers themselves can be parallel, twisted or plaited to form cordage. Due to the high elastic modulus, it is counteracted that the fibers are extended like elastic piping under load.

REFERENCE NUMBERS OF THE DRAWING

2 conveying wire
3 twisted or plaited fiber wire
4 disc-shaped conveying members
6 outer jacket (coating)
8 outer jacket parts
10 opposite end parts of outer jacket parts
12 beads or thickenings
14 opposing foot parts of disc-shaped conveying members
16 outermost foot parts of soft material
18 outer jacket parts
20 disc-shaped conveying members 22 interspaces between outer jacket parts
24 opposite end parts of outer jacket parts
26 foot parts of disc-shaped conveying members
28 disc-shaped conveying members
30 outer jacket parts
32 interspaces between disc-shaped conveying members
34 relatively long, outward tapering foot parts
36 opposite end parts of outer jacket parts
38 annular concave recess
40 annular bead
42 supply roll
44 curved arrow (clockwise)
46 weight
48 arrows showing production direction
50 guide wheel
52 injection moulding machine
54 cooling zone
56 guide wheel
58 winding station
60 curved arrow (counterclockwise)
62 weight

The invention claimed is:

1. A method of production of a conveying wire including a fiber wire and a plurality of mutually spaced disc-shaped conveying members, the fiber wire including twisted strands of threads or fibers, the method comprising:
coating at least one section of fiber wire with at least one section of an outer jacket by a continuous injection moulding process, the at least one section having annular beads or thickenings at opposed end parts;
connecting disc-shaped conveying members having opposed end parts by injection moulding the members directly onto the at least one section of the outer jacket or directly onto the fiber wire;
connecting the annular beads or thickenings at the opposed end parts of the at least one section of the outer jacket to the respective annular recesses in the opposed end parts of the disc-shaped conveying members; and
keeping the fiber wire under tension during unwinding and keeping the conveying wire under tension during winding.

2. The method of production of a conveying wire according to claim 1, comprising:
extending the opposed end parts of the at least one section of the outer jacket under or over the disc-shaped conveying members.

3. The method of production of a conveying wire according to claim 1, comprising:
fastening a plurality of spaced sections of the outer jacket by injection moulding with a thermoplastic elastomer directly to the conveying wire.

4. The method of production of a conveying wire according to claim 1, comprising:
positioning the annular beads or thickening of opposing end parts of the at least one section of the outer jacket to be internal to the opposing end parts of the disc-shaped conveying members; and
thereafter fastening the disc-shaped conveying members directly to the fiber wire.

5. A method of production of a conveying wire according to claim 1, wherein:
the fiber wire comprises plaited fibers.

6. The method of production of a conveying wire according to claim 1, comprising:
injection moulding a plurality of sections of the outer jacket directly onto the fiber wire with a mutual spacing; and
injection moulding the disc-shaped conveying members directly onto the fiber wire between opposed end parts of the plurality of sections of the outer jacket.

7. A method of production of a conveying wire according to claim 1, comprising:
injection moulding with a thermoplastic elastomer an outermost part of the end parts of the conveying members together with an outer jacket before injection moulding of the conveying members therebetween.

8. A method of production of a conveying wire according to claim 2, comprising:
injection moulding an outermost end part of the end parts of the conveying members in thermoplastic elastomer together with an outer jacket before injection moulding of the conveying member therebetween.

9. A conveying wire for use in an endless tube conveyor system, the conveying wire comprising disc-shaped conveying members, a fiber wire including twisted strands of threads or fibers, and a plurality of sections of an outer jacket over the fiber wire between the conveying members, end parts of the sections of the outer jacket extending under or over opposing end parts of the disc-shaped conveying members, and the opposing end parts of the sections of the outer jacket each including an annular bead or thickening.

10. The conveying wire according to claim 9, wherein the sections of the outer jacket are fastened to the conveying wire and spaced apart by injection moulding using a thermoplastic elastomer.

11. The conveying wire according to claim 9, wherein the annular bead or thickening of opposing end parts of the sections is disposed underneath the opposing end parts of the disc-shaped conveying members, which are fastened directly to the conveying wire.

12. A conveying wire according to claim 10, wherein the annular bead or thickening of opposing end parts of the sections is disposed underneath the opposing end parts of the disc-shaped conveying members which are fastened directly to the conveying wire.

13. A conveying wire according to claim 9, wherein at an outermost end part of the end parts, the conveying members include material identical to a material of the outer jacket and the outermost end parts are injection moulded together with the outer jacket before injection moulding of the conveying members.

* * * * *